United States Patent
Barker et al.

(10) Patent No.: US 8,720,030 B2
(45) Date of Patent: May 13, 2014

(54) BLOWN CABLE APPARATUS AND METHOD

(75) Inventors: Philip Alfred Barker, Suffolk (GB); Graham Anthony Laidler, Suffolk (GB); Christopher Nigel Munnings, Suffolk (GB); Ian Hunter, Suffolk (GB); Keith Eric Nolde, Suffolk (GB)

(73) Assignee: British Telecommunications Public Limited Company, London (GB)

( * ) Notice: Subject to any disclaimer, the term of this patent is extended or adjusted under 35 U.S.C. 154(b) by 381 days.

(21) Appl. No.: 13/260,105

(22) PCT Filed: Mar. 31, 2010

(86) PCT No.: PCT/GB2010/000635
§ 371 (c)(1), (2), (4) Date: Sep. 23, 2011

(87) PCT Pub. No.: WO2010/112852
PCT Pub. Date: Oct. 7, 2010

(65) Prior Publication Data
US 2012/0023723 A1    Feb. 2, 2012

(30) Foreign Application Priority Data
Mar. 31, 2009  (GB) .................................. 09505590.6

(51) Int. Cl.
*B23P 11/00*  (2006.01)
*B23Q 17/20*  (2006.01)
*B23Q 5/22*   (2006.01)

(52) U.S. Cl.
USPC ........... 29/407.05; 29/407.1; 29/709; 29/714; 29/819; 254/134.4; 254/134.3 R; 73/862.393; 73/862.381; 73/862.53

(58) Field of Classification Search
USPC ........ 29/407.01, 407.05, 7.08, 407.09, 407.1, 29/709, 714, 819; 254/134.4, 134.3 R; 73/862.393, 862.381, 862.53
See application file for complete search history.

(56) References Cited

U.S. PATENT DOCUMENTS 3,814,935 A   6/1974  Kissel
4,357,918 A   11/1982 Asano
(Continued)

FOREIGN PATENT DOCUMENTS

DE  42 02 147 A1    7/1993
DE  19649556 A1 *  6/1998
(Continued)

OTHER PUBLICATIONS

International Preliminary Report on Patentability, Application No. PCT/GB2010/000635, filed Mar. 31, 2010, report issued Oct. 4, 2011, 7 pages.
(Continued)

Primary Examiner — Jermie Cozart
(74) Attorney, Agent, or Firm — Patterson Thuente Pedersen, P.A.

(57) ABSTRACT

Apparatus for installing a cable into a tube with the assistance of a fluid drag acting on the cable within the tube with an installation device, the apparatus including a driving mechanism comprising a driving surface arranged to contact the cable substantially along the full driving surface length, for driving the cable into the tube, a first measurement device for obtaining a first value indicative of a rate at which the installation device is driving the cable into the tube, a second measurement device for obtaining a second value indicative of a rate at which the cable is travelling through the apparatus, a processor for detecting when the first value exceeds the second value, and for reducing the rate at which the installation device is driving the cable into the tube for the duration when the first value exceeds the second value.

20 Claims, 2 Drawing Sheets

(56) References Cited

U.S. PATENT DOCUMENTS

| | | | |
|---|---|---|---|
| 4,471,651 A | 9/1984 | Dimeff et al. |
| 4,856,937 A | 8/1989 | Grocott et al. |
| 4,880,484 A | 11/1989 | Obermeier et al. |
| 4,948,219 A | 8/1990 | Seino et al. |
| 5,002,090 A | 3/1991 | Ichikawa et al. |
| 5,109,598 A * | 5/1992 | Koch ........................... 29/825 |
| 5,121,644 A | 6/1992 | Grey et al. |
| 5,143,353 A | 9/1992 | Sano et al. |
| 5,199,689 A | 4/1993 | Proud et al. |
| 5,211,377 A | 5/1993 | Griffioen et al. |
| 5,248,128 A | 9/1993 | Warren et al. |
| 5,467,968 A | 11/1995 | Proud et al. |
| 5,699,996 A | 12/1997 | Boyle et al. |
| 5,813,658 A | 9/1998 | Kaminski et al. |
| 5,835,657 A | 11/1998 | Suarez et al. |
| 5,953,475 A | 9/1999 | Beier et al. |
| 6,129,341 A | 10/2000 | Griffioen et al. |
| 6,311,953 B1 | 11/2001 | Lang et al. |
| 6,328,283 B1 | 12/2001 | Reeve et al. |
| 6,364,290 B1 | 4/2002 | Barker |
| 6,370,753 B1 * | 4/2002 | Washburn ................ 29/407.01 |
| 6,418,264 B1 | 7/2002 | Hough et al. |
| 6,480,635 B1 | 11/2002 | Russell et al. |
| 6,631,884 B2 | 10/2003 | Griffioen et al. |
| 6,694,085 B2 | 2/2004 | Bergqvist et al. |
| 6,937,033 B2 | 8/2005 | Boronkay et al. |
| 6,992,580 B2 | 1/2006 | Kotzin et al. |
| 7,021,426 B2 | 4/2006 | Griffioen et al. |
| 7,064,559 B2 | 6/2006 | Bissonnette et al. |
| 7,151,878 B2 * | 12/2006 | Sutehall et al. .............. 385/100 |
| 7,209,028 B2 | 4/2007 | Boronkay et al. |
| 7,225,533 B2 | 6/2007 | Sylvia et al. |
| 7,408,474 B2 | 8/2008 | Frazier et al. |
| 7,562,861 B2 | 7/2009 | Fee et al. |
| 7,942,382 B2 | 5/2011 | Lecoq et al. |
| 8,117,923 B2 | 2/2012 | Sasaki |
| 8,275,227 B2 | 9/2012 | Thurlow et al. |
| 8,276,883 B2 | 10/2012 | Heatley et al. |
| 8,350,581 B1 | 1/2013 | Brady et al. |
| 2002/0034365 A1 | 3/2002 | Vogelsang |
| 2002/0121440 A1 | 9/2002 | Morris |
| 2002/0158239 A1 | 10/2002 | Griffioen et al. |
| 2003/0001592 A1 | 1/2003 | Boronkay et al. |
| 2003/0006669 A1 | 1/2003 | Pei et al. |
| 2003/0222663 A1 | 12/2003 | Acosta-Geraldino et al. |
| 2004/0135588 A1 | 7/2004 | Bissonnette et al. |
| 2005/0073327 A1 | 4/2005 | Walcott |
| 2006/0203086 A1 | 9/2006 | Pavakovic |
| 2006/0219992 A1 | 10/2006 | Fee et al. |
| 2006/0275008 A1 | 12/2006 | Xin |
| 2007/0047894 A1 | 3/2007 | Holmberg et al. |
| 2007/0104447 A1 | 5/2007 | Allen |
| 2008/0011990 A1 | 1/2008 | Kostet et al. |
| 2008/0013893 A1 | 1/2008 | Zheng et al. |
| 2008/0013907 A1 | 1/2008 | Zumovitch et al. |
| 2008/0050083 A1 | 2/2008 | Frazier et al. |
| 2008/0267714 A1 | 10/2008 | Lecoq et al. |
| 2009/0010606 A1 | 1/2009 | Thurlow et al. |
| 2009/0026429 A1 | 1/2009 | Barker et al. |
| 2009/0065547 A1 | 3/2009 | Heatley et al. |
| 2009/0065753 A1 | 3/2009 | Gonen et al. |
| 2009/0166597 A1 | 7/2009 | Weaver et al. |
| 2010/0148138 A1 | 6/2010 | Baker et al. |
| 2010/0155681 A1 | 6/2010 | Taylor et al. |
| 2011/0006786 A1 | 1/2011 | Heatley et al. |
| 2011/0062973 A1 | 3/2011 | Paterson |
| 2011/0079027 A1 | 4/2011 | Ghan et al. |
| 2011/0084244 A1 | 4/2011 | Heatley et al. |
| 2011/0135267 A1 | 6/2011 | Barker et al. |
| 2011/0178713 A1 | 7/2011 | Barker |
| 2012/0023723 A1 | 2/2012 | Barker et al. |
| 2012/0029846 A1 | 2/2012 | Heatley et al. |
| 2013/0011110 A1 | 1/2013 | Kerry et al. |

FOREIGN PATENT DOCUMENTS

| | | |
|---|---|---|
| DE | 10338950 | 6/2005 |
| EP | 0 108 590 A1 | 5/1984 |
| EP | 253636 | 1/1988 |
| EP | 0292037 | 11/1988 |
| EP | 0294243 | 12/1988 |
| EP | 0319194 | 6/1989 |
| EP | 1273902 | 1/2003 |
| EP | 1333303 | 8/2003 |
| EP | 1593994 | 11/2005 |
| EP | 1022569 | 7/2007 |
| EP | 1832903 | 9/2007 |
| EP | 1832908 | 9/2007 |
| EP | 1843181 | 10/2007 |
| FR | 2737053 | 1/1997 |
| FR | 2872299 | 12/2005 |
| GB | 2073440 | 10/1981 |
| GB | 2219662 | 12/1989 |
| GB | 2316496 | 2/1998 |
| GB | 2388966 | 11/2003 |
| JP | 5-328559 | 12/1993 |
| JP | 08163737 | 6/1996 |
| JP | 408178722 | 7/1996 |
| JP | 2000217216 | 8/2000 |
| JP | 4240806 | 3/2009 |
| SU | 1000750 | 2/1983 |
| WO | WO88/00713 | 1/1988 |
| WO | WO91/03756 | 3/1991 |
| WO | WO95/23988 | 9/1995 |
| WO | WO 98/12588 | 3/1998 |
| WO | WO 99/12066 | 3/1999 |
| WO | WO2006/103419 | 10/2006 |
| WO | WO 2006/103424 A1 | 10/2006 |
| WO | WO2007/101975 | 9/2007 |
| WO | WO2007104910 | 9/2007 |
| WO | WO 2007104913 | 9/2007 |
| WO | WO2007/113544 | 10/2007 |
| WO | WO2007/113549 | 10/2007 |
| WO | WO2007113519 | 10/2007 |
| WO | WO2007113549 | 10/2007 |
| WO | WO 2008/119976 A1 | 10/2008 |
| WO | WO2009/083722 | 7/2009 |
| WO | WO 2009083715 | 7/2009 |
| WO | WO 2009083721 | 7/2009 |
| WO | WO2009/131895 | 10/2009 |
| WO | WO 2010004288 | 1/2010 |
| WO | WO 2010034970 | 4/2010 |

OTHER PUBLICATIONS

International Search Report, Application No. PCT/GB2010/00635, mailed Jun. 5, 2011, 3 pages.
International Search Report for International Application No. PCT/GB2008/004277 dated May 28, 2009.
International Search Report for International Application No. PCT/GB2008/004281 dated May 28, 2009.
International Search Report for International Application No. PCT/GB2009/002222 dated Feb. 4, 2010.
International Search Report and Written Opinion for International Application No. PCT/GB2011/000432 dated Jun. 29, 2011.
International Search Report for International Application No. PCT/GB2007/000455 mailed Mar. 28, 2007.
International Search Report for International Application No. PCT/GB2007/001216 mailed Jul. 19, 2007.
FIST-GC02-F, Flat FIST generic closure organizer, Tyco Electronics Raychem, Belgium, as available on Sep. 26, 2012, at http://www.te.com/content/dam/te/global/english/industries/telecom-emea/products/documents/fiber-closures/TC-1032-DS-5-09-11.pdf.
Application and File History for U.S. Appl. No. 13/637,613, filed Sep. 26, 2012, inventors Kerry et al.
Application and File History for U.S. Appl. No. 12/281,384, filed Sep. 2, 2008, inventors Thurlow et al.
Application and File History for U.S. Appl. No. 12/295,750, filed Oct. 2, 2008, inventors Baker et al.
International Search Report for International Application No. PCT/GB2007/003811 mailed Jan. 11, 2008.

(56) References Cited

OTHER PUBLICATIONS

International Search Report for International Application No. PCT/GB2010/000487 dated Jul. 15, 2010.
Application and File History for U.S. Appl. No. 12/445,844, filed Apr. 16, 2009, inventors Taylor et al.
Application and File History for U.S. Appl. No. 12/810,731, filed Sep. 21, 2010, inventors Heatley et al.
Application and File History for U.S. Appl. No. 12/810,737, filed Dec. 21, 2010, inventors Heatley et al.
Application and File History for U.S. Appl. No. 13/120,124, filed Mar. 21, 2011, inventor Barker.
IEEE Guide for the Design and Installation of Cable Systems in Substations. Apr. 2008. 132 pages.
Draft Recommended Practices for Cable Installation in Generating Stations and Industrial Facilities, Jan. 2010. 94 pages.

* cited by examiner

BLOWN CABLE APPARATUS AND METHOD

RELATED APPLICATIONS

The present application is a National Phase entry of PCT Application No. PCT/GB2010/000635, filed Mar. 31, 2010, which claims priority from Great Britain Patent Application No. 0905590.6, filed Mar. 31, 2009, the disclosures of which are hereby incorporated by reference herein in their entireties.

TECHNICAL FIELD

This invention relates to methods, apparatus and systems related to the installation of cable into a conduit or a duct, particularly but not exclusively to the installation of fiber cable or minicable using a supply of compressed air to provide a fluid drag effect on the cable within the tube to assist in the installation.

BACKGROUND

Methods and apparatus of installing "blown fiber" are well known, wherein one or usually more of a number of optical fibers are "blown" into a previously laid conduit or tube with the assistance of a fluid drag to propel the fiber(s) along, as described in e.g. EP108590. Currently, this method is used by the applicant to install single fibers or more usually, a fiber unit comprising a number of individual fibers. An optical fiber measures mere microns in diameter, and the versions of blown fiber units installed by blowing techniques require little strengthening, so such fiber units are relatively lightweight and pliable. One version of a fiber unit used by the applicant, known as Enhanced Performance Fiber Units (EPFUs) is about 1 to 2 mm in diameter.

Installation of blown fiber is performed using a "blowing head" which essentially comprises a pair of electrically-powered drive wheels between which the fiber unit is driven into a tube coupled to the blowing head. A compressor is connected to the blowing head which directs a supply of compressed air into the tube through which the fiber unit is being driven. Various versions of blowing heads are known, such as those described in EP108590 (supra.), WO98/12588, or WO2006/103424. As noted above, the fiber unit being installed is lightweight and pliable and susceptible to buckling especially as the tube which the fiber unit is to occupy may be more a kilometer long. In such cases, friction within the tube may slow down or even stop the progress of the fiber unit within the tube. Parts of the fiber unit could also get caught within the fiber tube, and the reduction or cessation of movement of the fiber unit into the tube is transmitted back to the blowing head.

To deal with the ill effects of fiber buckle (which may include compromise of fiber integrity in performance or even physical terms), the blowing head covered by WO2006/103424 (supra.) (referred to here as the "current capping" blowing head or method) includes a feature providing that the electrical current supplied to the drive wheels is capped. When the progress of the fiber unit slows or stops, this is transmitted to the drive wheels, which correspondingly slows or stops to avoid putting excessive force on the fiber captured between the drive wheels.

Blown fiber is a significant installation technique in the push for Fiber to the Home (FTTH), wherein an all-optical network is envisaged to supply customers (i.e. private, residential customers in addition to commercial or industrial parties) with an optical connection between the access network direct to the customer's premises or home, or at least a good way thereto. As optical fiber is rolled out deeper into the access network however, capacity and congestion in optical fiber ducts is fast becoming a serious problem. One solution is the use of "blown cables", which are polymer sheathed optical fiber cable consisting of between 12 to 288 loose tube fibers or ribbon fiber, disposed, in some cases, individual "loose tube" fibers (typically 8 to 12 fibers per loose tube) housed in a polymer outer sheath, and are typically more than 10 mm in diameter. They are typically supplied and dispensed from a cable drum of significant mass mounted on conventional cable drum trailer. Blown cable therefore provide a much higher fiber count than fiber units for the space they occupy in the fiber ducts and are increasingly being deployed in preference to fiber units where space is scarce.

A slightly smaller sized fiber cable called "minicables" (also known as "microcables") is also deployed. The cable sheathing on such minicables is generally relatively thin to reduce the overall cable diameter, allowing for more minicable to be installed in a limited space. It is important to ensure that the fragile cable elements and optical fibers under the external sheath are handled and installed in a way so that they do not suffer from excessive stress during installation. In the main, minicables are configured in much the same way as fiber cables in being also a polymer sheathed cable, but with a smaller fiber count of between 12 to 96 fibers, measuring about 5 to 7 mm in diameter. The term "cable" and "blown cable" used in this description shall refer to either or both such cables, where the context permits.

"Blown cable" is a method of installing such blown or fiber cables and minicables using techniques and blowing heads much like that used for the more lightweight and flexible blown fiber units. This method is also known as "jetting". The blowing heads typically include drive wheels for mechanically driving the cable into the tube, and direct a supply of pressurized air from a compressor (typically 10 to 12 bar) into the bore of the conduit to provide the cable with a fluidized bed to help propel it along. However, blowing heads for installing blown cable have to be adapted for blowing the larger (in diameter), heavier and stiffer blown cable and minicables, which are supplied in the form of a cable drum having significant mass on a cable drum trailer.

The apparatus and devices used for installation of minicable comprise components which are larger in size than a standard fiber unit blowing head used for optical fiber units, to accommodate the greater overall dimensions and weight of minicable. An additional problem posed by the size and weight of the cable and the way minicable is supplied on large storage drums, is that while hauling off the minicable from the supply drum, a high level of inertia needs to be initially overcome. The resistance encountered during hauling the blown cable off its drum creates back tension on the cable which pulls against the action of the drive wheels to drive the cable into the waiting tube. Thus when the drive wheels haul the cable off the storage drum, the section of cable leading from the drum to the drive wheels of the blowing head is under considerable tension. This can be contrasted with the experience with blowing lightweight and flexible fibers or fiber units, where there is very little back-resistance or back-tension in the fiber as it is conveyed from the fiber storage pan to the drive wheels of the blowing head.

The problem is exacerbated by the cable coming off the drum being played out in an uneven, jerky manner. This is especially so when the end of a particular cable "layer" on the drum is reached. It is well known that while blowing fiber, especially through long tube routes (which currently could exceed 1 km in length), friction and other causes cause the fiber to suffer significant compression and tensile forces within the tube, causing the fiber to buckle. This may compromise the delicate fiber within the blown cables, as well as result in installation delay and or even for the session to be aborted so that it must be restarted. These issues are also experienced in installing blown cable (which shall in this description include both blown fiber cable and minicable).

Ideally, the cable should be blown into the tube as smoothly and evenly as possible, which is likely to be difficult given the propensity of the cable to be installed in a jerky manner into the tube at one end, and the uneven hauling off of the cable at the other end. To help smooth out the installation process at the tube end, the applicant has developed the current capping system blown fibers wherein the blowing head is capable of sensing an impending buckle—which is manifest in the form of a reduction in speed or cessation of movement of the fiber unit captured between the pair of drive wheels. When the impending buckle is sensed, the motor powering drive wheels reduce or stop the drive force which propels the fiber forward, as its current is capped.

In blown cable, however, the pulling and pushing (and any ancillary vibrational) forces inflicted on the cable at each end of the cable—frictional forces within the tube at one end, and inconsistent cable drum play out from the other—results in spasmodic cable action at the drive wheels of the blowing head, which plays havoc on the installation process. The cable itself undergoes considerable stress as well.

Examples of cable blowing heads are manufactured by Plumettez S.A. of Switzerland (the "MINUET" [trade], where the driving means comprise a pair of motor-driven belts) and CBS Products Ltd of the UK (the "Breeze" cable blowing machine). To protect the cable, the cable blowing heads of the prior art are often configured so that the motors powering the drive wheels stall when the friction between the cable and the tube exceed a pre-set limit. This is of course disruptive, and creates delay in the installation process.

There is therefore a need to address the problem of obtaining a smooth and even supply and conveyance of fiber cable or minicable to the driving mechanism of the blowing machine or head for installation using compressed air, and thence in similar fashion into and through the duct or tube.

An approach to protect the cable from continuing to be driven at a specific speed even when the friction between the cable and tube bore is such that actual cable progress is less than the driving speed, is to establish a preset with electrically powered motor current limit. When the limit is reached, the motor stalls, as would be the case with a hydraulically or air driven system.

One solution developed by the applicants is described in WO 2008119976, wherein the forces required to overcome the cable drum mass and pull the cable off the drum, and the installation force required to insert the cable into the tube with aid of compressed air, are separated. This is achieved by the use of two separate sets of drive wheels, one to pull the cable off the cable drum, and another to push the cable into the tube. The wheels are driven by four motors. The cable is driven through the two sets of drive wheels, and the weight of the cable forms a natural catenary between the sets of wheels. This catenary or cable bend is used to detect when there is a reduction in the rate of installation of the cable into the tube: when the bend or curve exceeds a pre-determined value, there is deemed to be a problem or a potential problem with the rate of installation so that the mechanical force driving the cable into the tube can be adjusted. The rate of catenary bend in the cable is detected using a dancer arm. This method relies on the mechanical properties of the cable: that it is able to form a catenary in the first place (as cables tend to vary considerably in terms of weight and stiffness), and if not the extent to which a bend can be induced or formed in the section of cable between the two sets of wheels. This limits the range of cable that may be used with such a machine, and may produce inconsistent and unexpected results with different cable types. In tests, the apparatus and methods of this invention has also been found to be complex to manufacture and to operate owing to the use of four motors and the arrangement of wheels to enable or induce a catenary in the cable between them.

Another cable installation machine is described in WO 9912066, in which a continuous drive assembly powered by a hydraulic motor is arranged to drive the cable into and through a duct. The speed at which the drive assembly operates relative to the speed of progress of the cable is monitored. In use, a certain amount of push force from the drive assembly is required to overcome obstacles in the form of irregularities, joints and bends present in the duct. When such irregularities are encountered, the speed at which the drive assembly is operating is greater than the speed of the cable, resulting in a certain amount of differential speed between the operating surfaces. Excessive differential speed could however result in cable slip (so that the cable surface rubs against the drive mechanism instead of being carried along with it) which in turn could damage the cable jacket or the cable itself. The apparatus in this document is set up so that if the speed of the drive assembly exceeds that of the cable by a predetermined amount, e.g. 15%, the drive assembly and their motors are shut down. In other words, the system shuts down only in the existence of what is deemed to be potentially catastrophic conditions, upon detection of cable slip of a magnitude which is deemed to be of an unacceptable.

Such a system suffers from various shortcomings. First, a figure has to be selected as the predetermined difference value: this is one probably based on historic data, trial and error, or worse still, a completely random number. As is well known, each installation operates under potentially vastly different conditions (length of installation, weather conditions, the type of cable in question and parameters such as weight, stiffness and diameter/subduct bore ratio, how convoluted and jointed the cable pathway is, how crowded the cable route is already, and so on)—any predetermined figure cannot be work optimally or near-optimally in all such cases. Furthermore, the "correct" predetermined value would vary at different stages during the installation process owing to changes within the duct in the cable pathway, in the level of friction existing between the cable and the duct, in the extent of the air cushion around the cable, especially at the far end of the duct, and so on. Based on this unreliable predetermined figure, the system is set up to take the drastic step of shutting down completely whenever the predetermined value is observed. If there was no risk of damage to the cable, this of course results in significant waste in manpower time and effort. At the same time, the cable remains at risk of damage if the predetermined value is set too low in the particular instance, e.g. where the irregularities within the duct fail to slow cable progress sufficiently to exceed the set predetermined value.

It would be desirable to address the above problems to enable smooth and consistent installation of blown cable.

SUMMARY OF THE INVENTION

According to an embodiment, there is provided an apparatus for installing a cable into a tube with the assistance of a fluid drag acting on the cable within the tube, the apparatus including: driving means comprising a driving surface arranged to contact the cable substantially along the full driving surface length, for driving the cable into the tube, first measurement means for obtaining a first value indicative of a rate at which the installation means is driving the cable into the tube, second measurement means for obtaining a second value indicative of a rate at which the cable is travelling through the apparatus, a processor for detecting when the first value exceeds the second value, and for reducing the rate at which the installation means is driving the cable into the tube for the duration when the first value exceeds the second value.

In installing an optical fiber cable or mini-cable using the blown fiber method, embodiments entail the use of a belt surface or the like which provides a surface along which length the cable has continuous or almost continuous contact. This provides a superior level of cable contact which discourages cable slip, as compared to point contact if drive wheels (without belts) are used. By conveying the cable (which can be of significant mass, compared to lightweight and flexible fiber units) using belt contact, a considerable part of the load is transferred away from the pairs of wheels. In certain embodiments, the driving surface arrangement comprises two belts which can be driven by a single motor (e.g. so that only one belt is driven, the other being driven only via an cable present between them). In another embodiment, both belts are driven, and driven by separate motors so that each belt is independent of the other.

During use, the rate at which the driving means (comprising the wheeled belt, in an embodiment) is operating is compared against the rate at which the cable is travelling through the apparatus and into the tube. Any difference between the two is calculated to determine if it is indicative of an impending cable slip (as described further below), and can be used to take action to change the driving rate of installation.

To maintain the integrity of the cable during installation, the differential speeds of both the drive belts and the cable installation rate into the subduct can be monitored. Embodiments can be configured to substantially avoid cable slip, by the detection of very small differentials in speed between the cable and the drive surface. In this way, a very rapid response to changes in cable speed can be made by correspondingly changing the driving speed. In other words, the diving speed of the belts is reduced (in one or more steps) for as long as, or for the duration that, the cable is incapable of progressing at the preset installation speed set for the drive belts. The installation speed is recovered to the preset speed (in one or more steps) when any obstacle to the progress of the cable within the tube or otherwise is removed so that the cable is once again capable of free movement.

The system can thus dynamically avoid cable slippage, thus cocooning the minicable from the effects of the driving surface continuing to push on the cable surface even where the cable is being obstructed from progressing at the driving speed within the tube, but instead achieving smooth and steady installation, with its attendant advantages of reducing stress from bending, and the application of tension and compression forces on the cable and the cable sheath. This is achieved by very quick detection of a speed differential in the progress of the cable relative to the driving surface, and very quick response to the detected speed differential.

In embodiments, the first and second measuring means take the form of encoder wheels, which generate pulses which widths can be directly compared with each other, to detect any speed differential between surface of the cable and the surface of the driving means (discussed in greater detail below).

According to an embodiment, there is provided a system for installing a cable into a tube with the assistance of a fluid drag acting on the cable within the tube, comprising the apparatus of embodiments for installing the cable, and a compressor for supplying pressurized air into the tube.

According to an embodiment, there is provided a method for installing a cable into a tube with the assistance of a fluid drag acting on the cable within the tube, comprising using a driving surface to drive the cable into the tube, by obtaining contact between the cable and the driving surface substantially along the full driving surface length, obtaining a first value indicative of a rate at which the installation means is driving the cable into the tube, obtaining a second value indicative of a rate at which the cable is travelling through the apparatus, detecting when the first value exceeds the second value comparing the first value and the second value, and reducing the rate at which the installation means is driving the cable into the tube for the duration when the first value exceeds the second value.

BRIEF DESCRIPTION OF THE DRAWINGS

Embodiments will now be described, by way of example only, with reference to the following drawings in which.

DETAILED DESCRIPTION

Figure 1:
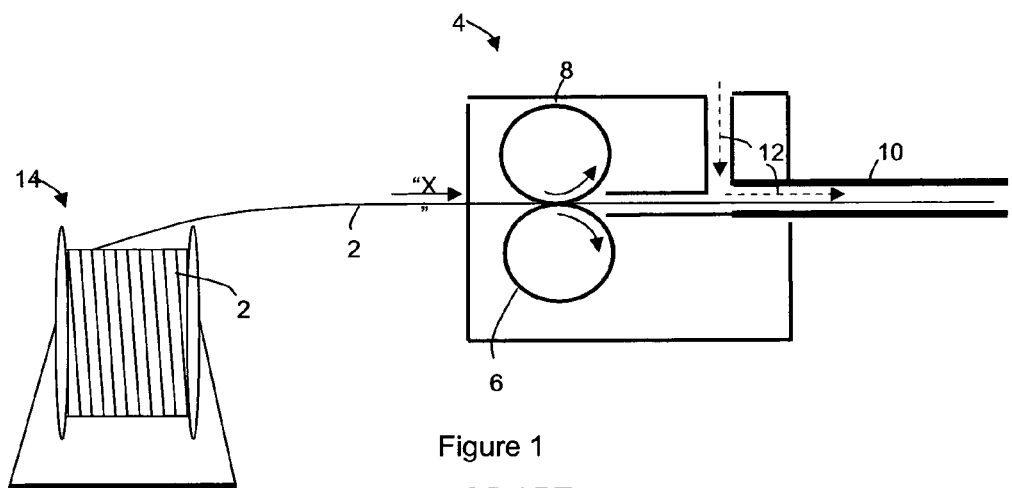
FIG. 1 is a representation of the main components making up a conventional cable blowing head.

In a typical conventional blowing head (4) as shown in FIG. 1, cable (2) is fed into one end of the blowing head and travels in the direction of arrow "X" through a bore extending the length of the head. The tube or duct (10) to be populated by the cable is connected to the blowing head at the other end of the bore. A pair of motorized drive wheels or belts (6, 8) engages with the cable, and drives it into the tube or conduit. At the same time, compressed air (12) from a compressor is fed into the blowing head via an "airbox" (into which is pumped the compressed air) and directed so that it travels along a section of the bore and into the tube. The highly-compressed air moves at speed into and through the tube, so as to create a fluid bed to carry the cable—which continues to be driven by the drive wheels—through the tube. As discussed above, friction can at some point start to overcome the fluid drag effect provided by the air movement within the tube, resulting in a slowing down or even stopping in the progress of the cable through the tube. Prior art blowing heads which do not monitor the progress of the cable which continue to drive the cable into the tube, thus requiring human or other intervention to stop the driving force to present a buckle or worse, physical damage to the cable.

Cable is supplied in a spooled form in a drum (14). In use, it is pulled off and gradually unwound from the drum as it is fed into the blowing head. Due to the relative weight and stiffness of the cable, and the mass and inertia of the drum (even when supported by a cable drum trailer so that it is free to rotate during the unwinding), a certain amount of force is required to pull the cable off to initially and subsequently convey to the blowing head. Furthermore, the cable is likely to be supplied to the blowing head at an uneven rate and speed. The drive wheels therefore need to cope with the tasks of pulling the cable off the drum and driving the cable into the tube, where the cable arrives for engagement with the drive wheels in a possibly spasmodic manner over time.

Figure 2:
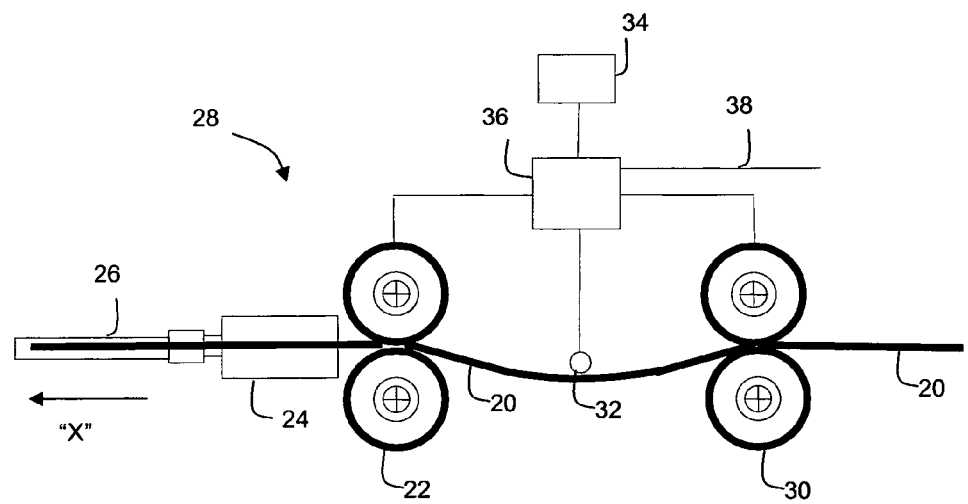
FIG. 2 depicts known apparatus for the installation of blown cable.

FIG. 2 depicts an earlier blowing head and apparatus (28) developed by the applicants, described in WO 2008119976, briefly discussed above, the disclosure of which is hereby incorporated by reference herein in its entirety. A second pair of wheels (30) is provided in this apparatus, which is dedicated to hauling cable off its storage drum. These wheels or belts are powered independently from the first set of drive wheels (22) due to the likelihood that different factors at each end of the blowing head will cause uneven drive speeds at each end as the cable travels through the apparatus. A slack control feedback mechanism (32) is provided at a point between the two set of wheels provides feedback to a cable installation controller (36) which controls and coordinates the operation of the cable drum drive wheels. By bending the cable in the section between the two sets of wheels, a buffer zone is created between the two sources of cable disruption, which isolates the two sets of wheels from each other, neutralizing any tension that would otherwise be present in a straight length of cable stretched between them.

The drive transistors for both the cable installation drive wheels (22) and cable drum drive wheels (30) are accommodated in the drive wheel electronics (36), powered by a voltage source (38). The speed of the installation drive wheels (22) is controlled by a battery powered controller (34). Any excessive friction in the tube during the installation process can be accommodated, in an embodiment, using current capping techniques to minimize or prevent any cable damage. Meanwhile, the speed of the back conveying wheels is regulated in dependence on the level of bend or slack in the cable between the two pairs of wheels. Feedback gathered about the level of slack is sent to the cable drive wheel electronics (36), which controls the relative speed of the cable drum drive wheels (30) to ensure each set of driving wheels is operating at a speed appropriate for its function.

As noted above, the method and apparatus of the prior art suffers from complexity introduced by the need to obtain and maintain a catenary which shape and extent can consistently and reliably indicate that cable installation is going smoothly, or that it is not, or that it will soon be not. Furthermore, it has been found in tests that the inertia levels of the cable drum was not as high as previously anticipated, so that there was no need for four motors individually driving each of the wheels, which added complexity and cost to the manufacture and operation of the apparatus. The use of the dancer arm was an added complication to the mechanism, and as operation of this machine in the field would introduce dirt and dust to the relatively sensitive dancer arm arrangement, this would adversely affect the long reliability of such mechanism.

Figure 3:
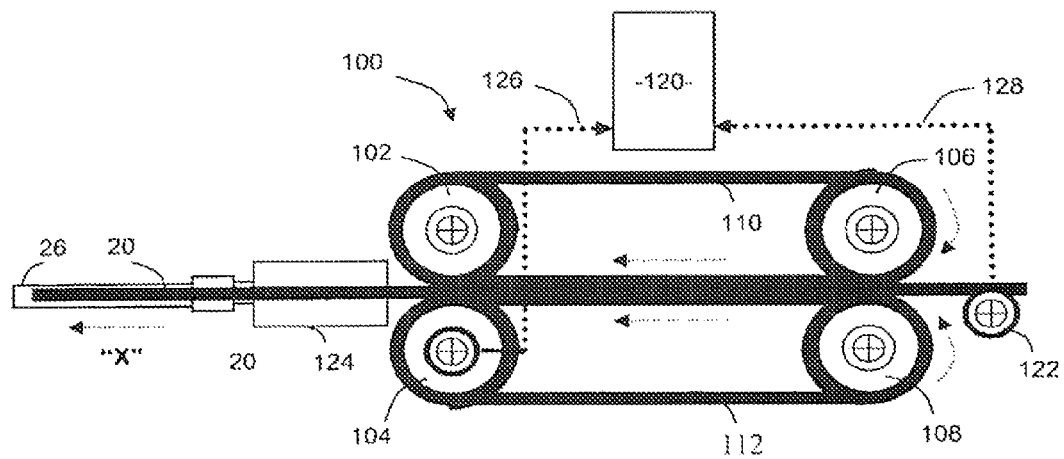
FIG. 3 is a blowing head according to an embodiment.

FIG. 3 depicts an embodiment of blown cable installation apparatus (100). A blown cable (20) is supplied from a drum (not shown) in the direction indicated by the arrow ("X"), passed through the installation device and into a tube (26).

Two pairs of powered or motorized drive wheels (102, 104 and 106, 108) are used. One pair of wheels (106, 108) is dedicated to the installation of the blown cable into the tube, while the other (102, 104) imparts a mechanical pushing force on the cable into the tube. In this description, the pair driving the cable into the tube will be referred to as the "insertion wheels", while the pair pulling the cable off its drum will be referred to as the "haul-off wheels". Two continuous or conveyor belts (110, 112) are arranged around the two sets of wheels which act as pulleys; the belts provide an increased surface area for cable contact and engagement, compared to e.g. point contact in the case of the drive wheels of the previous cable blowing apparatus of FIG. 2. Advantageously, the belts reduce the load that otherwise is driven and borne at the contact points of the drive wheels. The increased contact surface area also reduces the potential for cable slip between the two sets of wheels.

In use, the belts are driven in the direction indicated by arrows by the motorized drive wheels as shown in FIG. 2. Specifically, one insertion wheel and one haul-off wheel are used with each conveyor drive belt. The arrangement and position of the wheels allow the conveyor belts to define between them, a channel through which in use the cable passes through the apparatus. This channel is configured to exactly or very closely accommodate the cable width, so that the cable can be driven through the channel with no or minimal slippage with full or substantially full belt contact along the distance between the two sets of pulley wheels (102, 104, 106, 108). At the same time there is no excessive force imparted on the cable to crush it, although a larger blown cable is of a more robust construction than smaller versions (e.g. the smaller minicables or a blown fiber unit or individual fiber) and thus better able to withstand the application of axial pressure when passing through the pairs of drive wheels in particular.

Unlike the methods and apparatus of the prior art installation machine, the cable axis within the embodiment remains straight. There is now no need to deliberately introduce and maintain a certain bend or angle in the cable, which was often an unpredictable task not only between different types of cables, but also in different installation conditions.

The drive belts are powered by an electric motor (not shown). In an embodiment, the motor is operatively connected to one of the wheels so that the belt associated with that wheel is driven when the motorized wheel is powered. If the other belt is un-powered (i.e. where only one of the four pulley wheels is motorized), the other belt will be indirectly driven when a cable is placed in the channel between the two belts as described further below. In an embodiment, both belts are powered. The one motor can be coupled to a pulley wheel of the other belt. However, as one belt is running counter-clockwise to the other as indicated by the dotted arrows in FIG. 3, the need to transfer the drive force is not straightforward in design nor implementation. Moreover, this arrangement can in use result in a delay in the operational rate of the non-powered belt relative to the powered belt due mainly to gearing discrepancies.

In an embodiment, therefore, two motors are used, in an arrangement which operatively connects each motor to each belt. This permits each belt (110, 112) to be powered separately and independently of the other. This arrangement is a simpler mechanical arrangement than using a single motor to drive both belts. Using two motors also doubles the amount of torque available, and is likely to use two smaller motors (than one large one for the one-motor implementation) which enjoys the advantage of compactness, and avoids complicated gearing to drive both belts. These motors are configured to operate using an electronic control mechanism of current capping along the same lines as that of the previous installation apparatus shown in FIG. 2 and as described in WO 2008119976. In an embodiment, a control unit (120) is powered from a either a 240V or 110V AC supply, and so further electronics in the form of rectifiers and FETs provide power to the DC motors (typically 1500 W) which power the drive wheels.

In use, the leading end or tip of the cable (20) is pulled off the drum and fed into the space or channel defined by the two conveyor drive belts using the motorized drive wheels. On exiting the belted section of the apparatus (which is defined by the parts between and including the belts and the wheels), the cable passes into and through an airbox (124) into which a supply of compressed air is fed so that both the cable and air eventually enters the tube (26).

During installation, the progress of the cable being propagated through the tube can eventually slow down (smoothly or otherwise) when the cable has reached some distance within the tube, owing to e.g. an increased level of friction within the tube, or when an obstacle or interference within the tube or otherwise is encountered. When the speed at which the cable is progressing within the tube starts to reduce, this is detected within the apparatus and manifest at the earliest stages as an increase in the speed differential or resistance of the cable surface against the drive belt surface in direction "X." If the drive mechanism continues to operate without any change in the drive speed, the level of resistance or friction between section of cable between the belts escalates. If the obstruction is not overcome, matters can reach the stage where the cable starts to slip against the drive surface due to the differences between the actual rate of progress of the cable into the tube, and the driving speed of the drive wheels and belts. Continued failure to slow down or stop the driving motion can cause even a thick, stiff cable to buckle within the tube and within the installation apparatus, harming not only the cable but also the apparatus.

To accommodate changes in the speed at which the cable is progressing and thus protecting the cable from damage, the apparatus is configured to minutely compare the rate of cable installation with the rate at which the driving mechanism is operating in very fine steps or gradations. In the embodiment shown in FIG. 3, this task is carried out using a pair of encoder wheels operatively connected to a microprocessor. A first encoder wheel is operatively coupled to the driving mechanism (comprising drive belts, drive wheels and motors), which pulses provides the apparatus driving rate. This encoder wheel is here referred to as the "motor encoder". It can be located at any place allowing contact (direct or otherwise) with the driving mechanism as a whole—either set of wheels (102, 104 or 106, 108) or the belt. In FIG. 3, the motor encoder is part of the insertion drive belt mechanism (104). The skilled person would appreciate that it is possible to couple an encoder wheel for this purpose to other parts of the drive mechanism (other wheel(s), the belt(s) or the motor), and that there are other ways of determining the driving rate by e.g. reference to the motor output rate.

The second encoder wheel (122) is provided at a location where it makes contact with the cable being installed, and provides the rate at which the cable is moving. Although it can be located anywhere along the cable, FIG. 3 shows a location position at a point before the drive belts and the cable drum, this being a convenient position in the configuration of this embodiment of a blowing head. This encoder wheel (122) is free-wheeling so that its only stimulus is cable movement; it turns only when the cable is progressing into (or out of) the tube, so to accurately capture actual movement information, the encoder wheel is coupled to the cable in a way so that direct or indirect physical contact between the two generally maintained. This encoder wheel is referred here as the "idler encoder".

Figure 4:
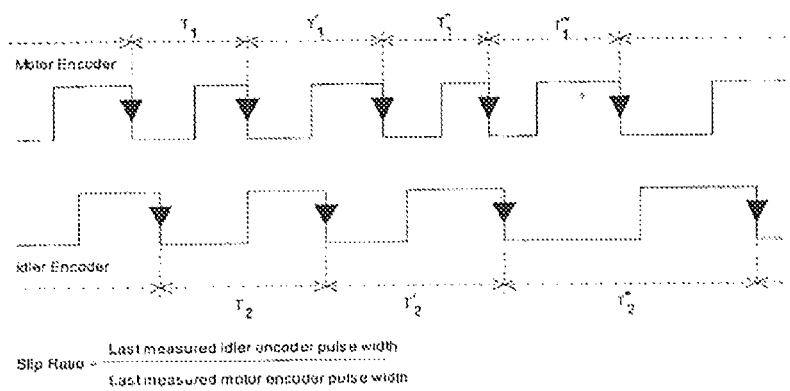
FIG. 4 is a representation of the operation of the apparatus according to an embodiment.

To find out if there is a "speed differential" in the form of a difference in driving speed compared to cable movement rates, the pulses output by the two encoders are sent (126, 128) to a controller in the form of a processor or microprocessor (120) where they are compared. As shown in the embodiment of FIG. 4, the pulse width (in micro- or milliseconds) ($T_1$) of the pulses from the motor encoder is minutely and continually compared with the pulse width ($T_2$) of the pulses from the idler encoder. It can be expected that these values are constantly varying in pulse width and relative phase as the cable is unlikely to install in a completely smooth manner, instead speeding up and slowing down throughout the installation session. In an embodiment, the system is set up to compensate for such operational ranges. By comparing the respective pulse frequencies of the encoders (i.e. their periodic times) from the start of the installation, the differential in speeds can be continuously monitored.

Viewing the comparison process in another way, an increasing differential speed ratio (which is a comparison of the speed of cable progress to the speed of the driving belts) of e.g. >1 indicates potential slippage, the magnitude of which can be monitored. A slip differential speed ratio of >2 can be considered high enough to serve as a ceiling value, so that if accompanied by a measurable increase in motor current (such as that which normally indicates that the end of the fiber route has been reached), such a value can be set to automatically identify that the cable has reached its end destination and can progress no further, indicating the end of the cable installation. Another use for this figure is to decrease the motor current and therefore, its speed, to minimize belt wear. The above differential speed ratios are for illustration only, as other ratios can be used or be more suitable in different cases e.g. for different cable types and installation conditions.

When the cable encounters an obstruction within the tube, the actual fiber speed begins to slow down relative to the belt speed: in such a case the idler encoder periods begin to increase relative to the motor encoder periods, and the drive belt speed begins to exceed the cable speed. If the obstruction is small relative to the driving force, the obstacle can be overcome by pushing the cable through the problem. If this is not possible or if it takes some time for the obstruction to be cleared or overcome, the cable can start slipping, where the drive belt continues to move but the cable fails to move in tandem with the driving surface.

Embodiments are designed to take no chances with the possibility of cable slip with its potentially adverse effects on the cable. Embodiments are thus arranged so that there is no attempt by the drive belts to keep pushing the cable along in the hope of overcoming the obstruction, as is the approach in some prior art machines. Instead, the detection and control aspects of the embodiments operate by constantly monitoring the pulses output by the plurality of encoders, so that it can be detected almost at once when the pulses encoders operate out of sync in time with each other. As noted above, use of a microprocessor for this purpose allows the system to be finely tuned to any differences in cable and drive wheel speeds in milli- or microseconds, so that instead of waiting for significant resistance or friction build up (or actual cable slip) to occur, a much earlier identification can be made of what might be an impending slip.

Embodiments are arranged to be capable of immediately (almost simultaneously upon detection of a differential in speeds) responding to detected speed differences. In the case where drive belt speed exceeds cable speed, this response takes the form of reducing the speed of the driving mechanism. For example, if the cable is being installed at 1 msec, the system is set up to respond within 5 mm of cable travel, which equates to a response time of 5 milliseconds. This sensitivity and response rate is significantly superior to conventional known apparatus and methods which operate using hydraulic or air powered drive motors and control systems which are incapable of the necessary level of fine control for the purpose of avoiding cable slip.

In an embodiment, the motors are arranged to progressively reduce the speed of the drive mechanism for as long as the encoder pulses continue to be out of sync in time with each other. In practice, this means that the force output by the drive mechanism sensitively and dynamically adapts according to the extent and duration of resistance felt between the respectively surfaces of the cable and the belt. When the progress of the cable initially begins to slow, the drive belt also slows in a coordinated fashion almost at the same time, as the microprocessor responses to the change in encoder pulse frequency or periodic time between the two pulse occurrences.

In the event of a slight obstruction, the easing off of the drive force on the cable allows for the possibility of the cable working itself free of or through the problem, possibly with the aid of the compressed air feeding through to the far end of the tube. Where the obstruction is more significant, the power supplied to the driving mechanism is progressively ramped down for as long as the encoder pulses remain out of sync with each other, preventing excessive pushing on the cable. In the case of a temporary obstruction, power supplied to the drive mechanism is subsequently recovered by easing back in one or more steps to preset levels as described further below.

Where the cable encounters a fatal obstruction not allowing it to progress any further, the drive belt speed is reduced to zero, in an embodiment, in the form of ramping the speed down in steps. In the "ramping down" implementation, the time taken to stop the drive force on the cable can potentially take less than a second. When the drive mechanism stops, an engineer can then examine the set up to determine the source of the problem, although it can be that the leading end of the cable has reached the destination, far end of the tube and entered an airstone which stops further progress of the cable within the tube, in which case the installation session is ended.

Embodiments can be set up to continually seek to return the cable installation speed to the preset installation speed. Thus when the obstruction is reduced or cleared so that the cable is once again able to move freely, embodiments detect that the speed differential no longer exists, and the drive belt speed recovers in sync with this. The recovery in driving speed recovery could comprise a jump in speed to the preset installation speed in a single step upon detection of obstruction clearance. However, in an embodiment, speed recovery takes the form of a gradual ramp up in speed, which in practice would allow speeds to be gently increased in a progressive manner as a cable gradually works free of an obstacle.

In this way, the cable is protected against sudden, potentially damaging jerks and sudden movements, and is therefore never pushed along at rates which it is not capable of travelling at, but smoothly installed into the tube or duct, avoiding the risk of cable and equipment damage.

Drive force is a function of motor current, therefore the motor current is also continually monitored and if necessary a capping level can be applied which reduces the target cable installation speed under microprocessor control. During an installation both speed and force are constantly being measured by the circuitry (120). In an embodiment, an option is to display this information to the user by means of an LCD panel on the front of the machine. The speed is measured by means of the idler encoder, and the force measured by means of motor current monitoring.

A number of variations and alternatives based on embodiments are possible to the devices, apparatus, methods, manufacturing methods and materials used. For example, it is not necessary to use a continuous conveyor belt to obtain the advantage of increased surface contact with the cable being installed as it passes through the installation apparatus although this is a convenient implementation. It would also be apparent to the skilled person that there would be a variety of ways to measure and compare the rates of the installation driving wheels and the progress of the cable into the tube. For example, it is convenient to compare the same unit of measurement (e.g. pulse widths) and so to use apparatus (encoder wheels) to measure and obtain these values, but the skilled person would appreciate that this is not necessary for the comparison to detect any difference in the rate of the installation belt/wheel assembly, and the rate at which the cable is actually progressing into the tube.

It is possible also to envisage other purposes, aims and environments to which these embodiments can be applied. For example, it will be realized that the smaller, lighter blown fiber units can also be installed in this manner in some situation.

Other types of cables, not being related to fiber optics, or indeed to telecommunications at all, can be installed in the manner described herein, to take advantage of the benefits of the use of such embodiments. Accordingly, this invention is not limited to the particular set up and applications described herein.

The invention claimed is:

1. Apparatus for installing a cable into a tube with the assistance of a fluid drag acting on the cable within the tube with an installation means, the apparatus comprising:
   driving means comprising a driving surface arranged to contact the cable substantially along a full driving surface length, for driving the cable into the tube;
   first measurement means for obtaining a first value indicative of a rate at which the installation means is driving the cable into the tube;
   second measurement means for obtaining a second value indicative of a rate at which the cable is travelling through the apparatus; and
   a processor for detecting when the first value exceeds the second value, and for reducing the rate at which the installation means is driving the cable into the tube for a duration when the first value exceeds the second value.

2. Apparatus according to claim 1 wherein the processor is arranged to progressively reduce the rate at which the installation means is driving the cable into the tube for the duration when the first value exceeds the second value.

3. Apparatus according to claim 2 wherein the processor is further arranged for detecting when the first value no longer exceeds the second value, and for increasing the rate at which the installation means is driving the cable into the tube.

4. Apparatus according to claim 3 wherein the processor is further arranged to progressively increase the rate at which the installation means is driving the cable into the tube upon detecting when the first value no longer exceeds the second value.

5. Apparatus according to claim 1 wherein the processor is further arranged for detecting when the first value no longer exceeds the second value, and for increasing the rate at which the installation means is driving the cable into the tube.

6. Apparatus according to claim 5 wherein the processor is further arranged to progressively increase the rate at which the installation means is driving the cable into the tube upon detecting when the first value no longer exceeds the second value.

7. Apparatus according to claim 1 wherein the driving means comprises a continuous belt arrangement.

8. Apparatus according to claim 1 wherein the driving means comprises two continuous belts and separate motors drive each of the two continuous belts.

9. Apparatus according to claim 1 wherein at least one of the first measurement means and the second measurement means comprises an encoder wheel.

10. Apparatus according to claim 9 wherein the encoder wheel of the first measurement means contacts the driving surface.

11. Apparatus according to claim 9 wherein the encoder wheel of the second measurement means is free-wheeling and which in use contacts the cable.

12. A system for installing a cable into a tube with the assistance of a fluid drag acting on the cable within the tube with an installation means, comprising:
  driving means comprising a driving surface arranged to contact the cable substantially along a full driving surface length, for driving the cable into the tube;
  first measurement means for obtaining a first value indicative of a rate at which the installation means is driving the cable into the tube;
  second measurement means for obtaining a second value indicative of a rate at which the cable is travelling through the apparatus;
  a processor for detecting when the first value exceeds the second value, and for reducing the rate at which the installation means is driving the cable into the tube for a duration when the first value exceeds the second value, wherein the driving mean, first measurement means, second measurement means and processor are provided for installing the cable; and
  a compressor for supplying pressurized air into the tube.

13. The system of claim 12 wherein the processor is arranged to progressively reduce the rate at which the installation means is driving the cable into the tube for the duration when the first value exceeds the second value.

14. The system of claim 12 wherein the processor is further arranged for detecting when the first value no longer exceeds the second value, and for increasing the rate at which the installation means is driving the cable into the tube.

15. The system of claim 14 wherein the processor is further arranged to progressively increase the rate at which the installation means is driving the cable into the tube upon detecting when the first value no longer exceeds the second value.

16. A method for installing a cable into a tube with the assistance of a fluid drag acting on the cable within the tube with an installation means, the method comprising:
  using a driving surface to drive the cable into the tube, by obtaining contact between the cable and the driving surface substantially along a full driving surface length of the driving surface;
  obtaining a first value indicative of a rate at which the installation means is driving the cable into the tube;
  obtaining a second value indicative of a rate at which the cable is travelling through an apparatus;
  detecting when the first value exceeds the second value by comparing the first value and the second value; and
  reducing the rate at which the installation means is driving the cable into the tube for a duration when the first value exceeds the second value.

17. The method of claim 16 further comprising progressively reducing the rate at which the installation means is driving the cable into the tube for the duration when the first value exceeds the second value.

18. The method of claim 16 further comprising detecting when the first value no longer exceeds the second value.

19. The method of claim 18 further comprising increasing the rate at which the installation means is driving the cable into the tube upon detecting when the first value no longer exceeds the second value.

20. The method of claim 19 further comprising progressively increasing the rate at which the installation means is driving the cable into the tube upon detecting when the first value no longer exceeds the second value.

* * * * *